(12) United States Patent  (10) Patent No.: US 9,524,384 B2
Nagafuchi                  (45) Date of Patent:     Dec. 20, 2016

(54) IMAGE OUTPUT APPARATUS, IMAGE OUTPUT SYSTEM, AND COMPUTER-READABLE RECORDING MEDIUM

(71) Applicant: Tatsuya Nagafuchi, Kanagawa (JP)

(72) Inventor: Tatsuya Nagafuchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/555,882

(22) Filed: Nov. 28, 2014

(65) Prior Publication Data

US 2015/0154395 A1    Jun. 4, 2015

(30) Foreign Application Priority Data

Nov. 29, 2013  (JP) ................................ 2013-247924

(51) Int. Cl.
| | | |
|---|---|---|
| *G06F 21/00* | (2013.01) | |
| *G06F 21/44* | (2013.01) | |
| *G06F 21/60* | (2013.01) | |
| *G06F 21/62* | (2013.01) | |
| *H04L 29/06* | (2006.01) | |

(52) U.S. Cl.
CPC .............. *G06F 21/44* (2013.01); *G06F 21/60* (2013.01); *G06F 21/6218* (2013.01); *H04L 63/08* (2013.01); *G06F 2221/2141* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,112,793 B2 * | 2/2012 | Kuribara | ............... | G06F 21/608 709/225 |
| 8,683,597 B1 * | 3/2014 | Johansson | ............. | H04L 63/083 726/25 |
| 2004/0223183 A1 * | 11/2004 | Oomori | ................... | G06F 21/31 358/1.15 |
| 2006/0111125 A1 * | 5/2006 | Karaoguz | ............. | H04L 63/083 455/456.2 |
| 2010/0017546 A1 | 1/2010 | Poo et al. | | |
| 2012/0096203 A1 * | 4/2012 | He | ........................ | G06F 13/385 710/110 |
| 2015/0097848 A1 | 4/2015 | Maeda | | |

FOREIGN PATENT DOCUMENTS

| | | |
|---|---|---|
| JP | 4900152 | 1/2012 |
| JP | 5087088 | 9/2012 |
| JP | 2015-76693 | 4/2015 |

\* cited by examiner

*Primary Examiner* — Beemnet Dada
(74) *Attorney, Agent, or Firm* — Oblon, McClelland, Maier & Neustadt, L.L.P.

(57) ABSTRACT

According to an embodiment of the present invention, an image output apparatus for outputting an output target image acquired from an external storage device which stores the output target image and which is externally connected to the image output apparatus includes a receiving unit configured to receive an access request requesting to access the external storage device, an authentication-information storage unit with authentication information stored therein, an authentication unit configured to perform authentication of the access request using the authentication information, and a control unit configured to control access to the external storage device based on a result of the authentication.

13 Claims, 14 Drawing Sheets

FIG.3

```
PUT /service/storage/files/usb1/z.jpg HTTP/1.1
Authorization: Basic YXBwOmFhYQ==
Host: 192.168.0.2
Content-type:application/octet-stream
Content-Length:620888
```

FIG.4

| METHOD | URI | OPERATION REQUEST | AUTHENTICATION TARGET? |
|---|---|---|---|
| GET | /service/storage | STORAGE-STATUS ACQUISITION REQUEST | TRUE |
| GET | /service/storage/metadata | FILE/DIRECTORY-STATUS ACQUISITION REQUEST | TRUE |
| GET | /service/storage/files | FILE/DIRECTORY ACQUISITION REQUEST | TRUE |
| POST | /service/storage/files | FILE/DIRECTORY CREATION/SAVE REQUEST | TRUE |
| PUT | /service/storage/files | FILE SAVE REQUEST | TRUE |
| DELETE | /service/storage/files | FILE/DIRECTORY DELETION REQUEST | TRUE |
| PUT | /service/projection | PROJECTION REQUEST | FALSE |

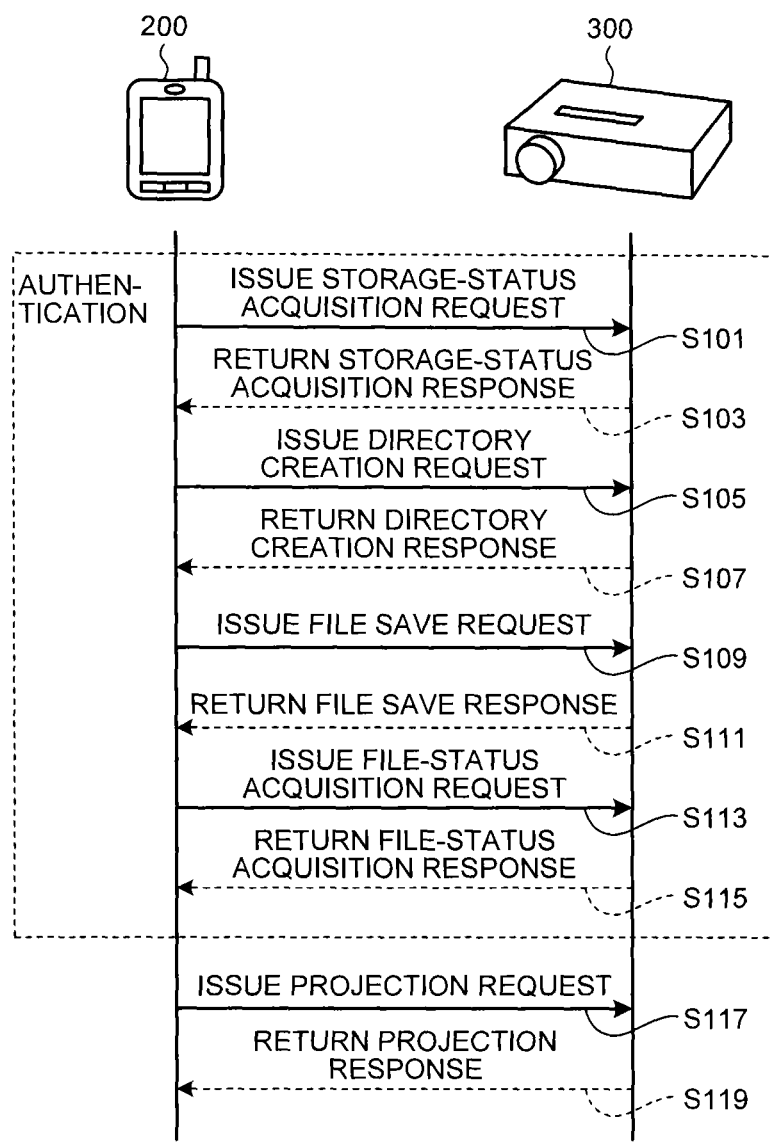

FIG.6

```
HTTP/1.1 201 Created
Content-Length: 0
Location: http://192.168.0.2/service/storage/files/usb1/z.jpg
Connection: Close
```

FIG.7

```
HTTP/1.1 401 Unauthorized
Content-Length: 0
Connection: Close
WWW-Authenticate:Digest
realm="",nonce="b8cbde4cfc72719e22737cd945a3f66e",algorithm=MD5,qop="auth"
```

FIG.10

|  | CREATE | DELETE | SAVE | PROJECT |
|---|---|---|---|---|
| ACCESS RIGHT A | enable | enable | enable | enable |
| ACCESS RIGHT B | disable | enable | enable | enable |
| ACCESS RIGHT C | disable | disable | enable | enable |
| ACCESS RIGHT D | disable | disable | disable | enable |

FIG.14

| AUTHENTICA-TION SCHEME | APPLICABLE? |
|---|---|
| Basic | inapplicable |
| Digest | applicable |

# IMAGE OUTPUT APPARATUS, IMAGE OUTPUT SYSTEM, AND COMPUTER-READABLE RECORDING MEDIUM

CROSS-REFERENCE TO RELATED APPLICATIONS

The present application claims priority to and incorporates by reference the entire contents of Japanese Patent Application No. 2013-247924 filed in Japan on Nov. 29, 2013.

BACKGROUND OF THE INVENTION

1. Field of the Invention

Embodiments of the present invention relate generally to an image output apparatus, an image output system, and a computer-readable recording medium.

2. Description of the Related Art

Conventionally-known techniques directed to an image output apparatus configured to output an output target image include a technique of saving the output target image to an external storage device externally connected to the image output apparatus.

For example, Japanese National Publication of International Patent Application No. 2010-506292 discloses a technique in which a host computer including an authentication application is connected to an external storage including an authentication module. If a result of authentication between the authentication application and the authentication module is positive, the host computer permits the external storage to access the host computer, but if the result of authentication between the authentication application and the authentication module is negative, the host computer is electrically disconnected from the external storage device.

According to the technique disclosed in Japanese National Publication of International Patent Application No. 2010-506292, attempt by an unauthorized third party to access the external storage can be blocked. Accordingly, unauthorized deletion of necessary data stored in the external storage or unauthorized saving of unnecessary data to the external storage can be prevented.

However, such a conventional technique as that described above disadvantageously requires that the external storage include an authentication module.

Accordingly, unless the external storage device externally connected to the image output apparatus has such a security function, attempt by an unauthorized third party to access the external storage device via the image output apparatus cannot be blocked.

Under the circumstances, there is a need to provide an image output apparatus, an image output system, and a computer-readable recording medium configured to block attempt by an unauthorized third party to access an external storage device externally connected to an image output apparatus via the image output apparatus even when the external storage device does not have a security function.

It is an object of the present invention to at least partially solve the problem in the conventional technology.

SUMMARY OF THE INVENTION

It is an object of the present invention to at least partially solve the problems in the conventional technology.

According to the present invention, there is provided an image output apparatus for outputting an output target image acquired from an external storage device externally connected to the image output apparatus and storing the output target image, the image output apparatus comprising: a receiving unit configured to receive an access request requesting to access the external storage device; an authentication-information storage unit with authentication information stored therein; an authentication unit configured to perform authentication of the access request using the authentication information; and a control unit configured to control access to the external storage device based on a result of the authentication.

The present invention also provides an image output system comprising: an external storage device storing an output target image; and an image output apparatus externally connected to the external storage device and configured to acquire the output target image from the external storage device and output the output target image, wherein the image output apparatus includes a receiving unit configured to receive an access request requesting to access the external storage device, an authentication-information storage unit with authentication information stored therein, an authentication unit configured to perform authentication of the access request using the authentication information, and a control unit configured to control access to the external storage device based on a result of the authentication.

The present invention also provides A non-transitory computer-readable recording medium having a program including instructions that, when executed by a computer configured to acquire an output target image stored in an external storage device externally connected to the computer and output the output target image, cause the computer to function as: a receiving unit configured to receive an access request requesting to access the external storage device; an authentication-information storage unit with authentication information stored therein; an authentication unit configured to perform authentication of the access request using the authentication information; and a control unit configured to control access to the external storage device based on a result of the authentication.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of an operation request according to the first embodiment;

FIG. 4 is a diagram illustrating an example of authentication target information according to the first embodiment;

FIG. 5 is a sequence diagram illustrating an example process performed in the image projection system according to the first embodiment;

FIG. 6 is a diagram illustrating an example file save response according to the first embodiment;

FIG. 7 is a diagram illustrating another example file save response according to the first embodiment;

FIG. 10 is a diagram illustrating an example of authorization information according to a second embodiment of the present invention;

FIG. 14 is a diagram illustrating an example of authentication scheme information of a fourth embodiment of the present invention;

DETAILED DESCRIPTION OF THE PREFERRED EMBODIMENTS

Exemplary embodiments of the present invention are described in detail below with reference to the accompanying drawings. Each embodiment is described by way of an example where the image output system is implemented as an image projection system for projecting an image. However, the image output system is not limited thereto, and alternatively may be an image forming system for forming an image or the like.

First Embodiment

Figure 1:
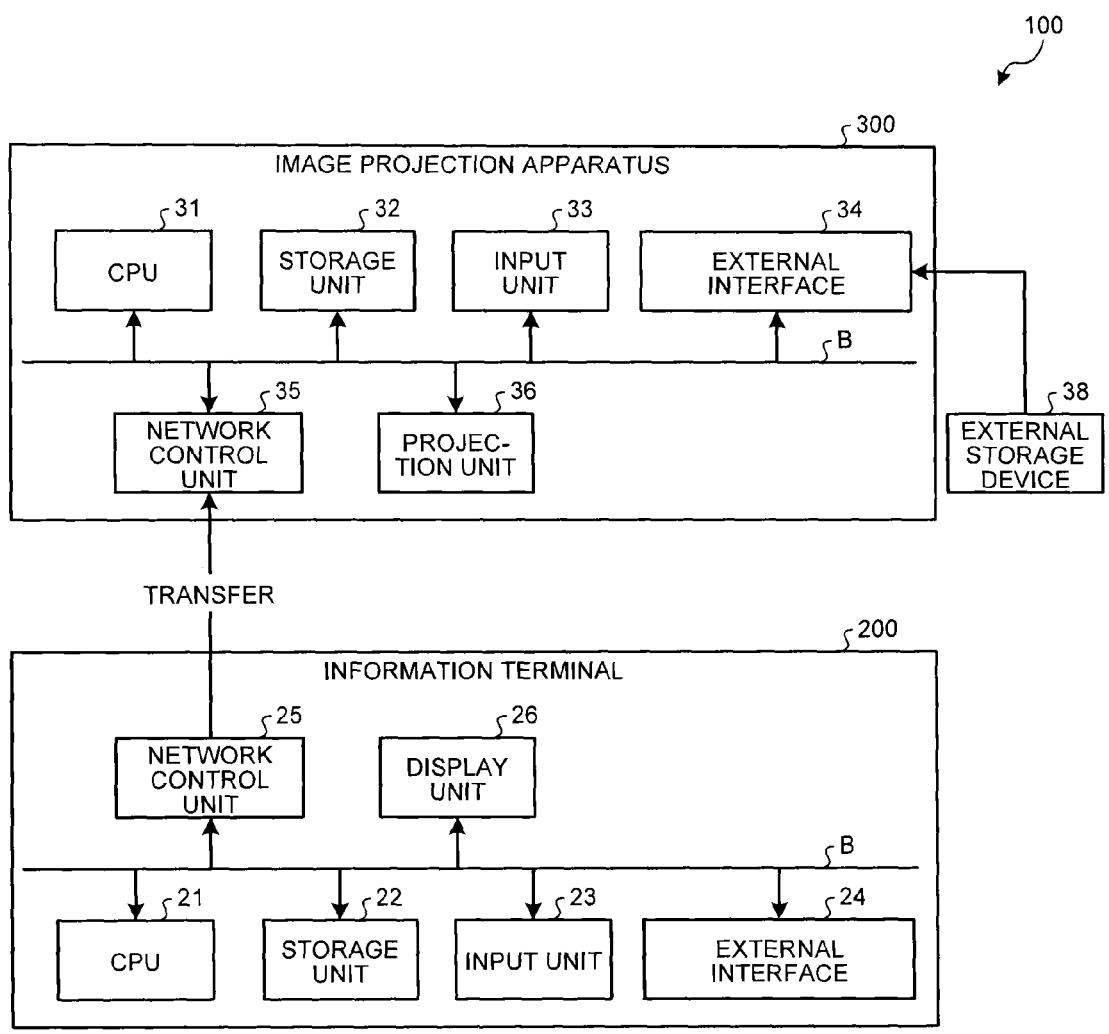
FIG. 1 is a block diagram illustrating an example hardware structure of an image projection system according to a first embodiment of the present invention.

FIG. 1 is a block diagram illustrating an example hardware structure of an image projection system 100 according to a first embodiment. As illustrated in FIG. 1, the image projection system 100 includes an information terminal 200, an external storage device 38, and an image projection apparatus 300.

In the first embodiment, connection between the information terminal 200 and the image projection apparatus 300 is established via a network (not shown) such as a LAN (local area network). However, the connection is not limited thereto, and may alternatively be established via a multimedia cable or the like.

The information terminal 200, which may be an information processing device such as a PC (personal computer), a smartphone, or a tablet computer, is configured to transfer projection target images to the image projection apparatus 300.

As illustrated in FIG. 1, the information terminal 200 includes a CPU (central processing unit) 21, a storage unit 22, an input unit 23, an external interface 24, a network control unit 25, a display unit 26, and a bus B.

The CPU 21 executes program instructions (hereinafter, "program") stored in the storage unit 22 to control units of the information terminal 200. The storage unit 22 includes a ROM (read only memory) and an HDD (hard disk drive) which store the program to be executed by the CPU 21 and data necessary for execution of the program and a RAM (random access memory) serving as, for example, a work area of the CPU 21. The input unit 23 which may be, for example, a touch panel, a keyboard, and/or a mouse is used to make various inputs to the information terminal 200. The external interface 24 which may be, for example, a USB (universal serial bus) is used to connect between a peripheral device(s) and the information terminal 200. The network control unit 25 which may be, for example, an NIC (network interface card) is configured to establish network connection between the information terminal 200 and external equipment such as the image projection apparatus 300. The display unit 26 which may be, for example, a touch panel display or a liquid crystal panel is configured to display various screens and the like. The bus B connects between the CPU 21, the storage unit 22, the input unit 23, the external interface 24, the network control unit 25, and the display unit 26 to one another.

The external storage device 38 is a storage device capable of storing large amounts of data and may be, for example, a memory card, an HDD, or an SSD (solid state drive).

In the first embodiment, the external storage device 38 is externally connected to the image projection apparatus 300 via an external interface such as a USB. However, the connection is not limited thereto, and the external storage device 38 may be externally connected to the image projection apparatus 300 via a network or the like.

The image projection apparatus 300 which may be, for example, a projector is configured to save a projection target image transferred from the information terminal 200 to the external storage device 38 and project the projection target image acquired from the external storage device 38.

As illustrated in FIG. 1, the image projection apparatus 300 includes a CPU 31, a storage unit 32, an input unit 33, an external interface 34, a network control unit 35, a projection unit 36, and the bus B.

The CPU 31 executes program stored in the storage unit 32 to control the units of the image projection apparatus 300. The storage unit 32 includes a ROM and an HDD which store the program to be executed by the CPU 31 and data necessary for execution of the program and a RAM serving as, for example, a work area of the CPU 31. The input unit 33 which may be, for example, a touch panel, a keyboard, and/or a mouse is used to make various inputs to the image projection apparatus 300. The external interface 34 which may be, for example, a USB is configured to connect between a peripheral device(s) and the image projection apparatus 300. In the first embodiment, the image projection apparatus 300 is externally connected to the external storage device 38 via the external interface 34. The network control unit 35 which may be, for example, an NIC is configured to establish network connection between external equipment such as the information terminal 200 and the image projection apparatus 300. The projection unit 36 which may be, for example, a projection optical system including a projection lens is configured to project a projection target image acquired from the external storage device 38 onto a screen or the like. The bus B connects between the CPU 31, the storage unit 32, the input unit 33, the external interface 34, the network control unit 35, and the projection unit 36 to one another.

Figure 2:
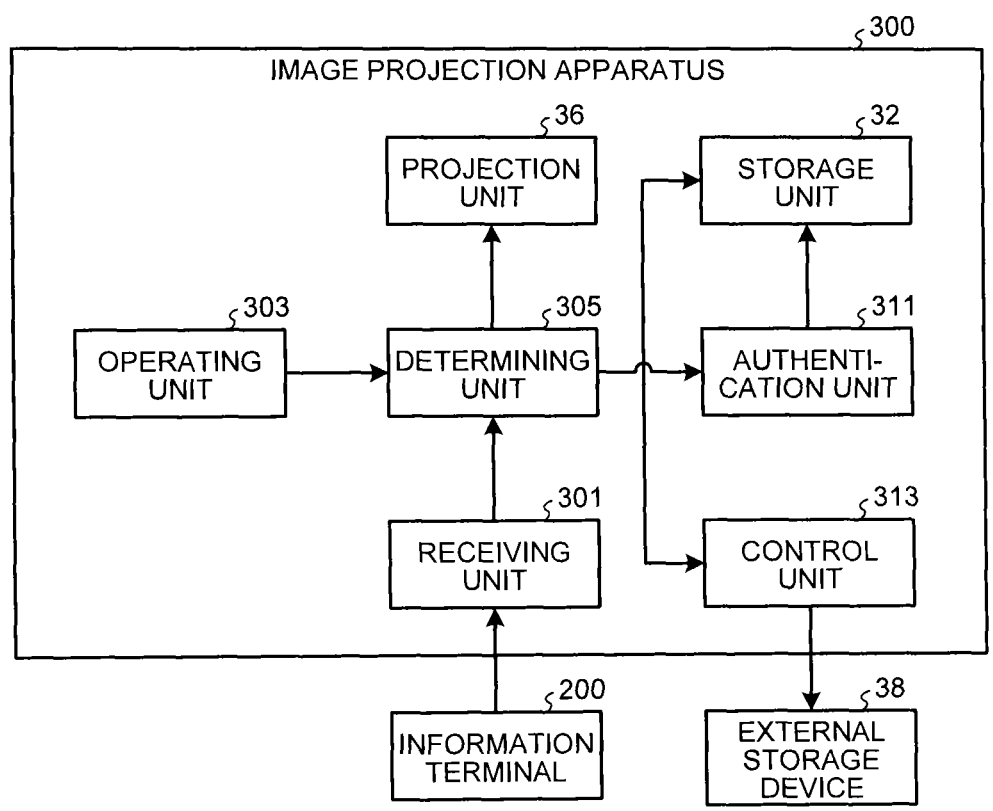
FIG. 2 is a block diagram illustrating an example functional configuration of an image projection apparatus according to the first embodiment.

FIG. 2 is a block diagram illustrating an example functional configuration of the image projection apparatus 300 according to the first embodiment. As illustrated in FIG. 2, the image projection apparatus 300 includes a receiving unit 301, an operating unit 303, a determining unit 305, the storage unit 32, an authentication unit 311, a control unit 313, and the projection unit 36. The receiving unit 301, the determining unit 305, the authentication unit 311, and the control unit 313 can be implemented by the CPU 31, for example. The operating unit 303 can be implemented by the input unit 33, for example.

The receiving unit 301 is configured to receive an access request requesting to access the external storage device 38. More specifically, the receiving unit 301 receives an operation request containing an operation on the external storage device 38 as an access request. Meanwhile, the receiving unit 301 receives the operation request from the information terminal 200 or the like.

In the first embodiment, the operation request is, but not limited to, at least any one of a request for deleting a projection target image (file), a request for acquiring a projection target image (file), a request for saving a projection target image (file), a request for projecting a projection target image (file), a request for acquiring status of a projection target image (file), a request for deleting a directory, a request for acquiring a directory, a request for creating a directory, a request for acquiring status of a directory, and a request for acquiring status of the external storage device 38 (storage).

In the first embodiment, the operation request is described as an HTTP (hypertext transfer protocol) message containing an HTTP method and a URI (uniform resource identifier) and contains authentication-scheme identification information for identifying an authentication scheme and information (hereinafter, "authentication subject information") for use in authenticating a request source of the operation request. However, form of the operation request is not limited thereto.

FIG. 3 is a diagram illustrating an example operation request according to the first embodiment. The operation request illustrated in FIG. 3 is an HTTP message requesting that a projection target image (file) be saved. The HTTP method "PUT" and the URI "/service/storage/files/ . . . " indicate that the operation request is a file save request requesting that the projection target image (file) be saved. "Basic" corresponds to authentication-scheme identification information and indicates that Basic Authentication is designated as an authentication scheme. Note that the authentication scheme to be designated is not limited to Basic Authentication and other authentication scheme can be designated. "YXBwOmFhYQ==" corresponds to authentication subject information. In this example, "YXBwOmFhYQ==" is obtained by converting a user name and password entered by a user, i.e., request source, to BASE64 representation. However, authentication subject information is not limited thereto.

The storage unit 32 stores authentication information. Examples of the authentication information include a pair of a user name and password. The storage unit 32 further stores authentication target information which defines operation requests which are authentication targets. FIG. 4 is a diagram illustrating an example of the authentication target information according to the first embodiment. In the example illustrated in FIG. 4, the authentication target information is a table where each operation request (HTTP method and URI) is associated with indication of whether or not the operation request is an authentication target. In this example, the operation requests other than the projection request are authentication targets. Note that which operation request be defined as an authentication target is not limited thereto. The projection request may be defined as an authentication target; a request other than the projection request may be defined as not being an authentication target.

The determining unit 305 determines whether or not the operation request received by the receiving unit 301 is an authentication target using the authentication target information stored in the storage unit 32. For instance, the determining unit 305 determines that an operation request received by the receiving unit 301 is an authentication target using the authentication target information illustrated in FIG. 4 if the operation request is defined as an authentication target but determines that the operation request is not an authentication target if the operation request is not defined as an authentication target.

The authentication unit 311 performs authentication of the access request received by the receiving unit 301 using the authentication information stored in the storage unit 32. More specifically, the authentication unit 311 performs authentication of the operation request that is determined as an authentication target by the determining unit 305. For instance, the authentication unit 311 may perform authentication of the operation request by checking authentication subject information contained in the operation request against the authentication information stored in the storage unit 32. In the example illustrated in FIG. 3, the authentication unit 311 checks the authentication subject information converted to BASE64 representation against the authentication information and determines that the operation request is authenticated if there is a match, but determines that the operation request is not authenticated if there is no match.

The control unit 313 controls access to the external storage device 38 based on a result of the authentication performed by the authentication unit 311. More specifically, if the operation request is authenticated by the authentication unit 311, the control unit 313 provides control that enables the operation on the external storage device 38 requested by the operation request (by, for example, establishing connection with the external storage device 38). If the operation request is not authenticated by the authentication unit 311, the control unit 313 provides control that disables the operation on the external storage device 38 requested by the operation request (by, for example, remaining not establishing connection with the external storage device 38). If the operation request is determined as not being an authentication target by the determining unit 305, the control unit 313 provides control that enables the operation on the external storage device 38 requested by the operation request.

The projection unit 36 projects a projection target image acquired by the control unit 313 from the external storage device 38.

FIG. 5 is a sequence diagram illustrating an example process performed in the image projection system 100 according to the first embodiment.

The information terminal 200 issues a storage-status acquisition request to the image projection apparatus 300 (Step S101).

Thereafter, upon receiving the storage-status acquisition request, the image projection apparatus 300 performs authentication of the storage-status acquisition request. If the request is authenticated, the image projection apparatus 300 determines whether or not the external storage device 38 is connected to the image projection apparatus 300 and returns a result of the determination as a storage-status acquisition response to the information terminal 200 (Step S103). If the request is not authenticated, the image projection apparatus 300 returns to the information terminal 200 a storage-status acquisition response which notifies that the request is not authenticated.

If the image projection apparatus 300 is connected to the external storage device 38, the information terminal 200 issues a directory creation request to the image projection apparatus 300 (Step S105).

Upon receiving the directory creation request, the image projection apparatus 300 performs authentication of the directory creation request. If the request is authenticated, the image projection apparatus 300 creates a specified directory in a storage area in the external storage device 38 and returns to the information terminal 200 a directory creation response which notifies that the directory is created (Step S107). If the request is not authenticated, the image projection apparatus 300 returns to the information terminal 200 a directory creation response which notifies that the request is not authenticated.

Thereafter, the information terminal 200 issues a file save request to the image projection apparatus 300 (Step S109).

Upon receiving the file save request, the image projection apparatus 300 performs authentication of the file save request. If the request is authenticated, the image projection apparatus 300 saves a specified file to a specified location in the directory of the external storage device 38 and returns to the information terminal 200 a file save response (see FIG. 6, for example) which notifies that the file is saved (Step S111). In the example illustrated in FIG. 6, the HTTP status code "201 Created" indicates that the request is authenticated and the file is saved. If the request is not authenticated, the image projection apparatus 300 returns to the information terminal 200 a file save response (see FIG. 7, for example) which notifies that the request is not authenticated. In the example illustrated in FIG. 7, the HTTP status code "401 Unauthorized" indicates that the request is not authenticated and the file is not saved.

Thereafter, the information terminal 200 issues a file-status acquisition request to the image projection apparatus 300 (Step S113).

Upon receiving the file-status acquisition request, the image projection apparatus 300 performs authentication of the file-status acquisition request. If the request is authenticated, the image projection apparatus 300 determines whether or not the specified file is at the specified location in the directory of the external storage device 38 and returns a result of the determination as a file-status acquisition response to the information terminal 200 (Step S115). If the request is not authenticated, the image projection apparatus 300 returns to the information terminal 200 a file-status acquisition response which notifies that the request is not authenticated.

Thereafter, the information terminal 200 issues a projection request to the image projection apparatus 300 (Step S117).

Upon receiving the projection request, the image projection apparatus 300 acquires the file from the specified location in the directory of the external storage device 38 and performs projection. When the projection is completed, the image projection apparatus 300 returns a projection response which notifies that the projection is completed to the information terminal 200 (Step S119).

Figure 8:
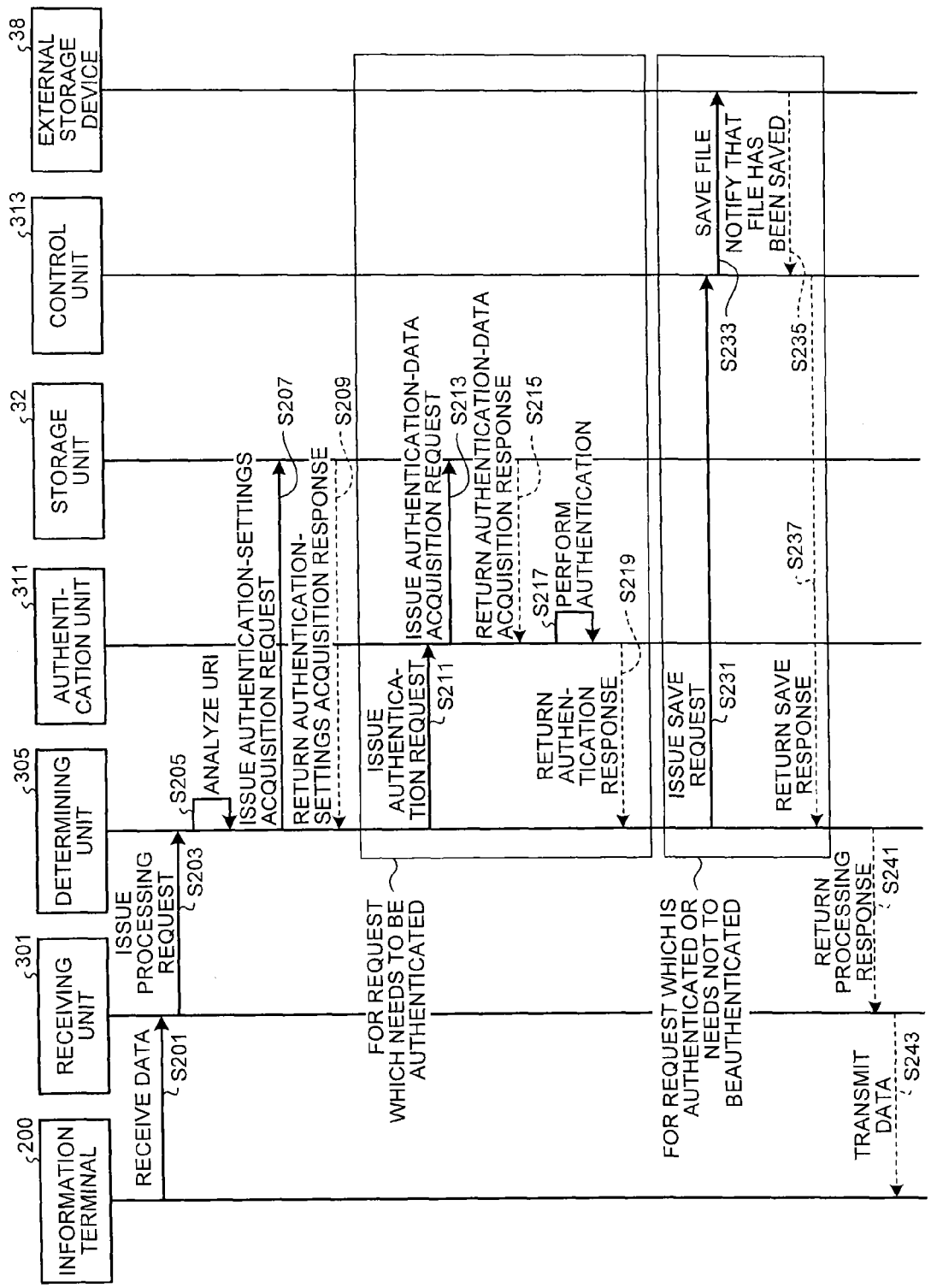
FIG. 8 is a sequence diagram illustrating an example of detailed steps to be taken to process a file save request and a file save response in the image projection system according to the first embodiment.

FIG. 8 is a sequence diagram illustrating an example of detailed steps to be taken to process a file save request and a file save response in the image projection system 100 according to the first embodiment.

The receiving unit 301 receives an operation request from the information terminal 200 (Step S201) and requests the determining unit 305 to perform analysis (Step S203).

The determining unit 305 analyzes the operation request (which includes a method and a URI) and identifies that the operation request is a file save request (Step S205).

The determining unit 305 issues an authentication-settings acquisition request to the storage unit 32 (Step S207), acquires the authentication target information as an authentication-settings acquisition response (Step S209), and determines whether or not the file save request is an authentication target.

If the file save request is an authentication target, the determining unit 305 issues an authentication request to the authentication unit 311 (Step S211). The authentication unit 311 issues an authentication-data acquisition request to the storage unit 32 (Step S213) and acquires the authentication information as an authentication-data acquisition response (Step S215). The authentication unit 311 performs authentication of the file save request by checking authentication subject information contained in the file save request against the authentication information (Step S217) and returns a result of the authentication as an authentication response to the determining unit 305 (Step S219).

If the file save request is not an authentication target or if the request is authenticated, the determining unit 305 issues a save request to the control unit 313 (Step S231). The control unit 313 provides control that enables a saving operation, which is requested by the file save request, to the external storage device 38 and saves a target file to the external storage device 38 (Step S233). Upon receiving a notification that the file has been saved (Step S235), the authentication unit 311 returns to the determining unit 305 a save response which notifies that the file has been saved (Step S237). Note that, if the request is not authenticated, the process of Step S231 through S237 is not performed.

If the request is not authenticated, because the determining unit 305 does not issue a save request to the control unit 313, the control unit 313 keeps controlling the saving operation, which is requested by the file save request, to the external storage device 38 to be disabled.

Thereafter, the determining unit 305 returns a result of processing the file save request as a processing response to the receiving unit 301 (Step S241). The receiving unit 301 returns the result of processing the file save request to the information terminal 200 as a file save response (Step S243). If the file save request is not an authentication target or if the request is authenticated, the result of processing the file save request is the result of saving the file ("the file has been saved" or "the file is not saved"). If the request is not authenticated, the result of processing the file save request is the authentication result ("the request is not authenticated").

Figure 9:
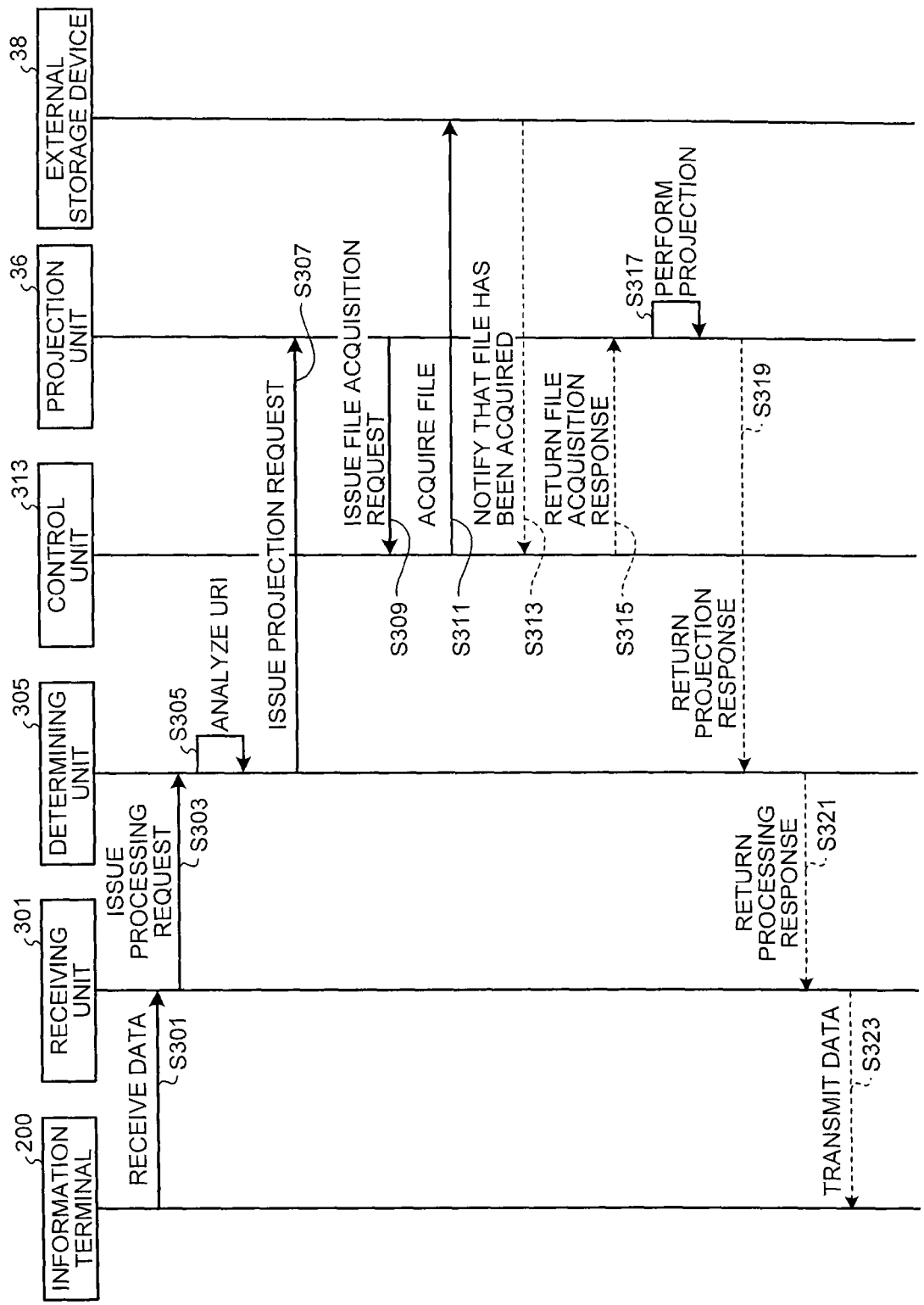
FIG. 9 is a sequence diagram illustrating an example of detailed steps to be taken to process a projection request and a projection response in the image projection system according to the first embodiment.

FIG. 9 is a sequence diagram illustrating an example of detailed steps to be taken to process a projection request and a projection response in the image projection system 100 according to the first embodiment.

The receiving unit 301 receives an operation request from the information terminal 200 (Step S301) and requests the determining unit 305 to perform analysis (Step S303).

Thereafter, the determining unit 305 analyzes the operation request (which includes a method and a URI) and identifies that the operation request is a projection request (Step S305).

The determining unit 305 issues an authentication-settings acquisition request to the storage unit 32, acquires the authentication target information as an authentication-settings acquisition response, and determines whether or not the projection request is an authentication target. In this example, it is assumed that the projection request is not an authentication target.

In this case, the determining unit 305 issues a projection request to the projection unit 36 (Step S307). The projection unit 36 issues a file acquisition request to the control unit 313 (Step S309). The control unit 313 provides control that enables an acquisition operation, which is requested by the projection request, from the external storage device 38 and acquires a file from the external storage device 38 (Step S311). Upon receiving a notification that the file has been acquired from the external storage device 38 (Step S313), the control unit 313 returns the acquired file as a file acquisition response to the projection unit 36 (Step S315).

The projection unit 36 projects the acquired file (projection target image) (Step S317) and returns a projection response to the determining unit 305 (Step S319).

The determining unit 305 returns a result of processing the projection request as a processing response to the receiving unit 301 (Step S321). The receiving unit 301 returns the result of processing the projection request to the information terminal 200 as a projection response (Step S323). The result of processing the projection request is a projection result ("projection has been performed" or "projection is not performed").

As described above, according to the first embodiment, the image projection apparatus 300 performs authentication without utilizing a function of the external storage device 38. Accordingly, even if the external storage device 38 externally connected to the image projection apparatus 300 does not have a security function, attempt by an unauthorized third party to access the external storage device 38 via the image projection apparatus 300 can be blocked.

In particular, in the first embodiment, a user that is a request source of an operation request is required to input authentication information such as a user name and password to cause the operation request to contain the authentication information. Accordingly, an unauthorized third party which does not have such authorized user name and password is blocked from operating the external storage device 38 via the image projection apparatus 300. Consequently, for example, unauthorized deletion of necessary data stored in the external storage device 38 or unauthorized saving of unnecessary data to the external storage device 38 can be prevented.

Second Embodiment

A second embodiment describes an example which further uses authorization to perform an operation on the external storage device 38. The following discussion will focus primarily on features of the second embodiment that differ from those according to the first embodiment. Elements of the second embodiment providing functions similar to those of the first embodiment are denoted by like names and reference numerals and repeated description is omitted.

In the second embodiment, the storage unit 32 further stores authorization information which defines whether or not authorization to perform an operation required by an operation request is granted. FIG. 10 is a diagram illustrating an example of the authorization information according to the second embodiment. In the example illustrated in FIG. 10, operations that can be performed on the external storage device 38 are defined for each of access rights. For example, access right A permits to perform all of the operations including creation, deletion, saving, and projection. By contrast, access right C permits to perform operations of saving and projection but does not permit to perform operations of creation and deletion.

The determining unit 305 determines whether or not a request source of an operation request received by the receiving unit 301 has authorization to perform the operation request using the authorization information stored in the storage unit 32. For instance, if the authentication information stored in the storage unit 32 further contains information of access rights, the determining unit 305 acquires an access right of the request source authenticated by the authentication unit 311 and determines whether or not the request source has authorization to perform the operation request using the authorization information illustrated in FIG. 10.

If the request source does not have authorization to perform the operation request, the control unit 313 provides control that disables the operation on the external storage device 38 requested by the operation request.

Figure 11:
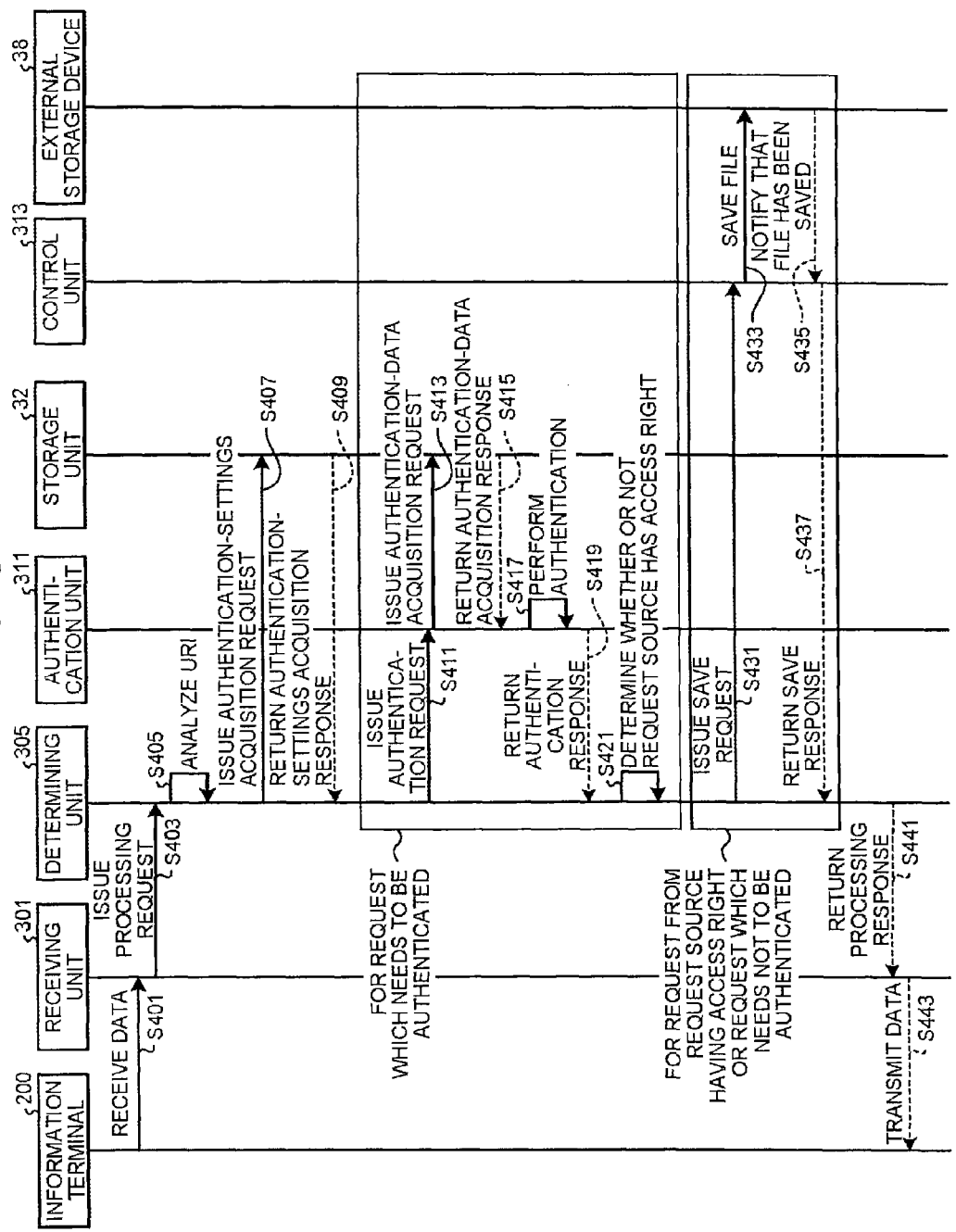
FIG. 11 is a sequence diagram illustrating an example of detailed steps to be taken to process a file save request and a file save response in the image projection system according to the second embodiment.

FIG. 11 is a sequence diagram illustrating an example of detailed steps to be taken to process a file save request and a file save response in the image projection system 100 according to the second embodiment.

The process of Steps S401 through S409 is similar to that of Steps S201 through S209 of the sequence diagram illustrated in FIG. 8.

If the file save request is an authentication target, the determining unit 305 issues an authentication request to the authentication unit 311 (Step S411). The authentication unit 311 issues an authentication-data acquisition request to the storage unit 32 (Step S413) and acquires authentication information as an authentication-data acquisition response (Step S415). The authentication unit 311 performs authentication of the file save request by checking authentication subject information contained in the file save request against the authentication information (Step S417) and returns a result of the authentication as an authentication response to the determining unit 305 (Step S419).

The authentication information contains, in addition to user names and passwords, access rights. The authentication result contains the access right of the request source. The determining unit 305 determines whether or not the request source of the operation request has authorization to perform the operation request using the access right contained in the authentication result and the authorization information illustrated in FIG. 10 (Step S421).

The process of Steps S431 through S443 is similar to that of Steps S231 through S243 of the sequence diagram illustrated in FIG. 8. Note that the process of Step S431 and subsequent steps is performed only when the file save request is not an authentication target or when the request is authenticated and the request source has authorization to perform the file save request.

If the request is not authenticated or if the request source does not have authorization to perform the file save request, because the determining unit 305 does not issue a save request to the control unit 313, the control unit 313 keeps controlling the saving operation, which is requested by the file save request, to the external storage device 38 to be disabled.

According to the second embodiment, both security and convenience can be obtained by assigning different access rights that vary from one another in operations the access right permits.

Third Embodiment

A third embodiment describes an example in which an image projection system includes multiple external storage devices. The following discussion will focus primarily on features of the third embodiment that differ from those of the first embodiment. Elements of the third embodiment providing functions similar to those of the first embodiment are denoted by like names and reference numerals and repeated description is omitted.

Figure 12:
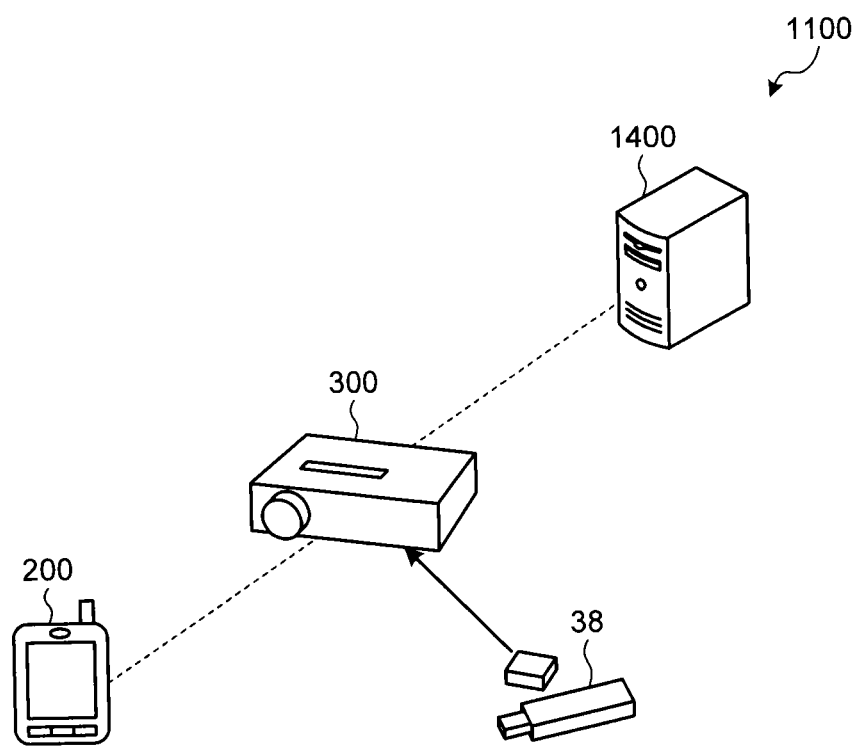
FIG. 12 is a schematic diagram illustrating an example configuration of an image projection system according to a third embodiment of the present invention.
Figure 13:
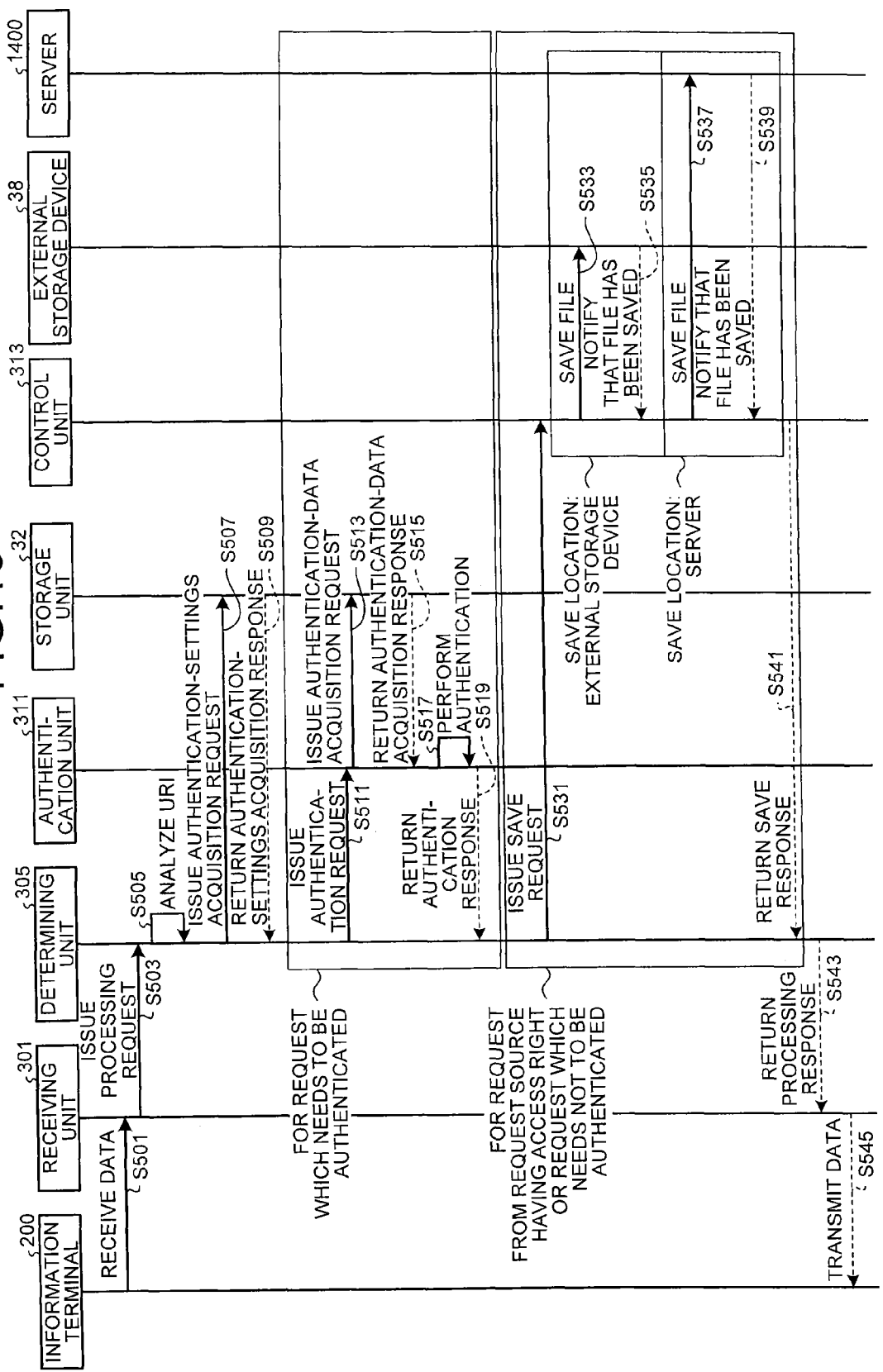
FIG. 13 is a sequence diagram illustrating an example of detailed steps to be taken to process a file save request and a file save response in the image projection system according to the third embodiment.

FIG. 12 is a schematic diagram illustrating an example configuration of an image projection system 1100 according to the third embodiment. As illustrated in FIG. 13, in the third embodiment, not only the external storage device 38 but also a server 1400 functions as the external storage device.

The server 1400 is externally connected to the image projection apparatus 300 via, but not limited to, a network.

FIG. 13 is a sequence diagram illustrating an example of detailed steps to be taken to process a file save request and a file save response in the image projection system 1100 according to the third embodiment.

The process of Steps S501 through S519 is similar to that of Steps S201 through S219 of the sequence diagram illustrated in FIG. 8.

If the file save request is not an authentication target or if the request is authenticated, the determining unit 305 issues a save request to the control unit 313 (Step S531). The file save request contains a result of URI analysis obtained at Step S505. The control unit 313 determines which one of the external storage device 38 and the server 1400 is a location where a target file is to be saved (hereinafter, "file save location") based on the analysis result. For instance, a save request containing a URI where "files/" is followed by "usb1" as does the file save request illustrated in FIG. 3 specifies the external storage device 38 as the file save location. A save request containing a URI where "files/" is followed by "server11" specifies the server 1400 as the file save location.

If the file save location is the external storage device 38, the control unit 313 provides control that enables a saving operation, which is requested by the file save request, to the external storage device 38 and saves the file to the external storage device 38 (Step S533). The control unit 313 receives a notification that the file has been saved from the external storage device 38 (Step S535).

On the other hand, if the file save location is the server 1400, the control unit 313 provides control that enables a saving operation, which is requested by the file save request, to the server 1400 and saves the file to the server 1400 (Step S537). The control unit 313 receives a notification that the file has been saved from the server 1400 (Step S539).

The control unit 313 returns to the determining unit 305 a save response which notifies that the file has been saved (Step S541). Note that, if the request is not authenticated, the process of Step S531 through S541 is not performed.

Thereafter, the determining unit 305 returns a result of processing the file save request as a processing response to the receiving unit 301 (Step S543). The receiving unit 301 returns the result of processing the file save request to the information terminal 200 as a file save response (Step S545). If the file save request is not an authentication target or if the request is authenticated, the result of processing the file save request is the result of saving the file ("the file has been saved" or "the file is not saved"). If the request is not authenticated, the result of processing the file save request is the authentication result ("the request is not authenticated").

In the third embodiment, the image projection system including multiple external storage devices is described by way of example of the file save request. Even when an operation request other than the file save request is issued, which one of the external storage devices the operation is to be performed can be identified through similar processing.

According to the third embodiment, advantages of other embodiments can be enjoyed even when the image projection system includes multiple external storage devices.

Fourth Embodiment

A fourth embodiment describes an example in which restriction is imposed on applicable authentication schemes. The following discussion will focus primarily on features of the fourth embodiment that differ from those of the first embodiment. Elements of the fourth embodiment providing functions similar to those of the first embodiment are denoted by like names and reference numerals and repeated description is omitted.

In the fourth embodiment, the storage unit 32 further stores authentication scheme information which defines applicable authentication schemes. FIG. 14 is a diagram illustrating an example of the authentication scheme information according to the fourth embodiment. Referring to the example illustrated in FIG. 14, Digest Authentication, which is a safer one of Basic Authentication and Digest Authentication, is defined as an applicable authentication scheme.

The determining unit 305 determines whether or not an authentication scheme indicated by authentication-scheme identification information contained in an operation request received by the receiving unit 301 is an applicable authentication scheme using the authentication scheme information stored in the storage unit 32. For instance, using the authentication scheme information illustrated in FIG. 14, the determining unit 305 determines that, if the authentication scheme indicated by the authentication-scheme identification information is Digest Authentication, the authentication scheme is applicable. If the authentication scheme is not Digest Authentication, the determining unit 305 determines that the authentication scheme is inapplicable.

If the authentication scheme indicated by the authentication-scheme identification information is not an applicable authentication scheme, the control unit 313 provides control that disables the operation on the external storage device 38 requested by the operation request.

Figure 15:
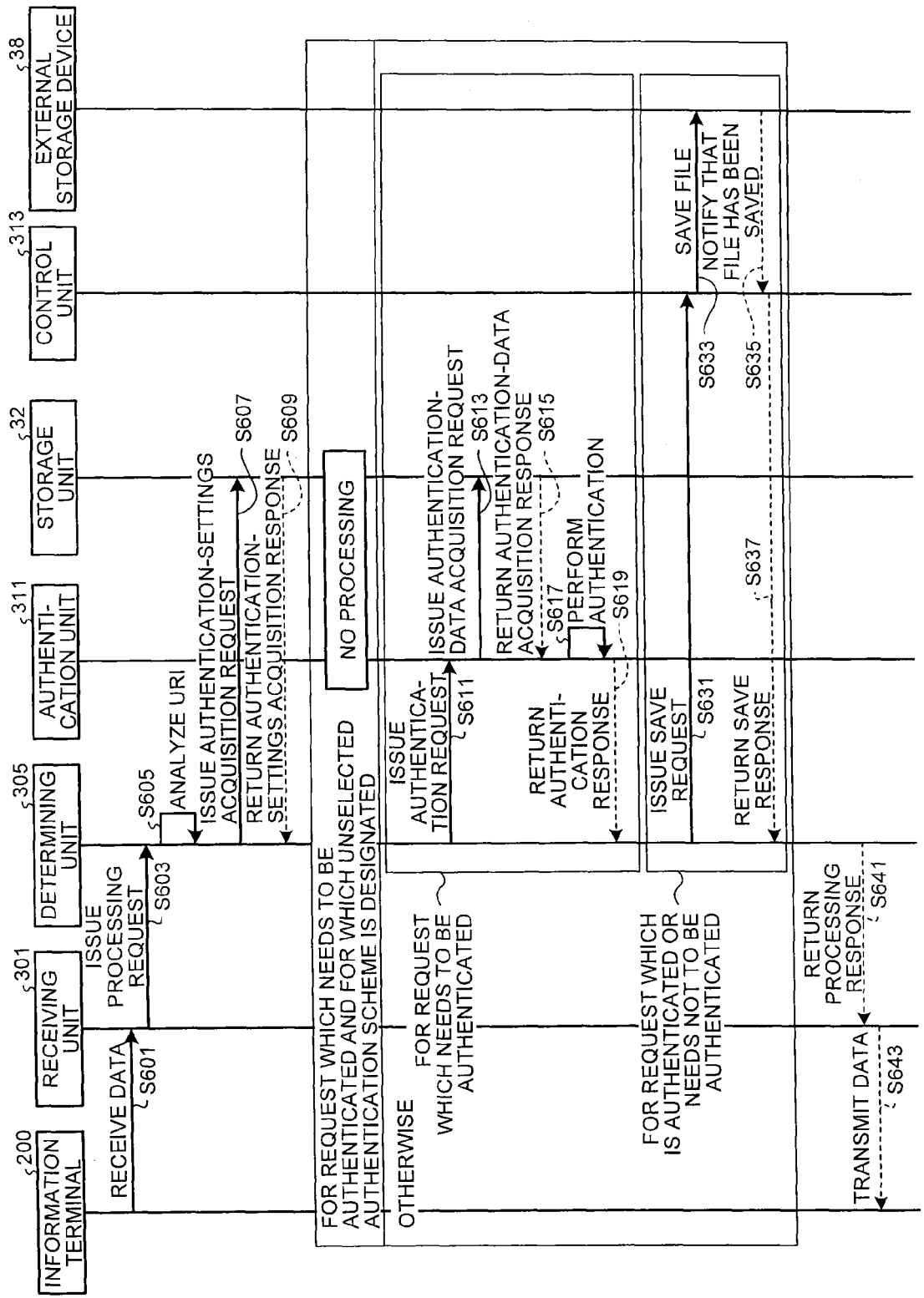
FIG. 15 is a sequence diagram illustrating an example of detailed steps to be taken to process a file save request and a file save response in the image projection system according to the fourth embodiment.

FIG. 15 is a sequence diagram illustrating an example of detailed steps to be taken to process a file save request and a file save response in the image projection system 100 according to the fourth embodiment.

The process of Steps S601 through S605 is similar to that of Steps S201 through S205 of the sequence diagram illustrated in FIG. 8.

The determining unit 305 issues an authentication-settings acquisition request to the storage unit 32 (Step S607) and acquires the authentication target information and the authentication scheme information as an authentication-settings acquisition response (Step S609). The determining unit 305 determines whether or not the authentication scheme indicated by authentication-scheme identification information contained in the file save request is an applicable authentication scheme, and determines whether or not the file save request is an authentication target.

The process of Steps S611 through S643 is similar to that of Steps S211 through S243 of the sequence diagram illustrated in FIG. 8. Note that the process of Step S611 and subsequent steps is performed only when the authentication scheme is an applicable authentication scheme and the file save request is an authentication target.

If the request is not authenticated or if the authentication scheme is not an applicable authentication scheme, because the determining unit 305 does not issue a save request to the control unit 313, the control unit 313 keeps controlling a saving operation, which is requested by the file save request, to the external storage device 38 to be disabled.

According to the fourth embodiment, security can be enhanced by imposing restriction on applicable authentication schemes.

Fifth Embodiment

A fifth embodiment describes an example in which the authentication unit 311 is blocked from accepting authentication of an operation request after a predetermined number of consecutive failed authentication attempts. The following discussion will focus primarily on features of the fifth embodiment that differ from those of the first embodiment. Elements of the fifth embodiment providing functions similar to those of the first embodiment are denoted by like names and reference numerals and repeated description is omitted.

In the fifth embodiment, the determining unit 305 does not allow the authentication unit 311 to accept authentication of an operation request after a predetermined number of consecutive failed authentication attempts. The determining unit 305 causes the authentication unit 311 to accept authentication of the operation request after lapse of a predetermined time or causes the authentication unit 311 to accept authentication of the operation request based on a restart request which is input from the operating unit 303.

Figure 16:
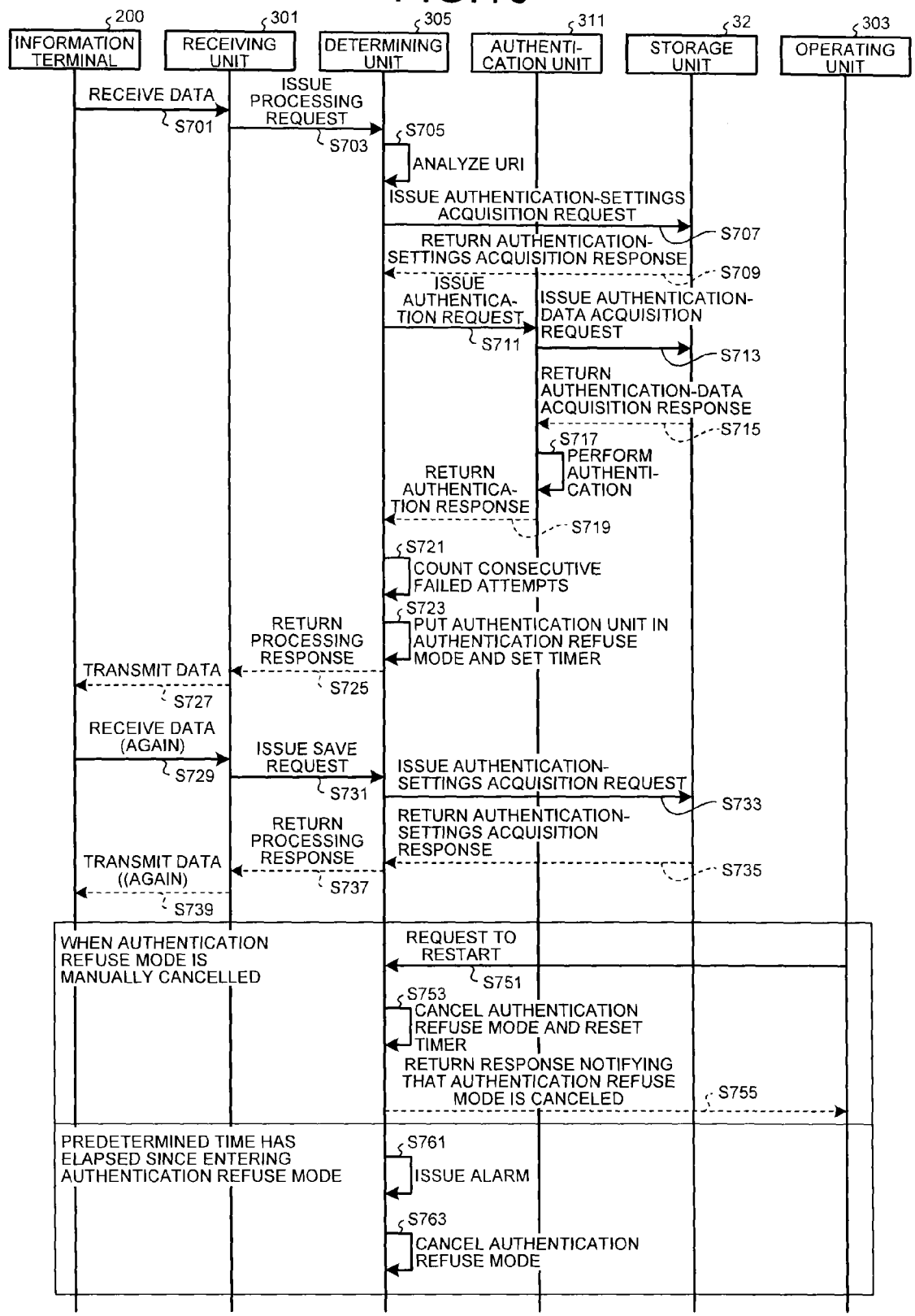
FIG. 16 is a sequence diagram illustrating an example of detailed steps to be taken to process a file save request and a file save response in the image projection system according to a fifth embodiment of the present invention.

FIG. 16 is a sequence diagram illustrating an example of detailed steps to be taken to process a file save request and a file save response in the image projection system 100 according to the fifth embodiment.

The process of Steps S701 through S719 is similar to that of Steps S201 through S219 of the sequence diagram illustrated in FIG. 8.

The determining unit 305 counts the number of consecutive failed authentication attempts. The determining unit 305 increments a counter when an authentication result is that the request is not authenticated, but resets the counter when the authentication result is that the request is authenticated (Step S721).

When the counter value reaches a predetermined number, the determining unit 305 puts the authentication unit 311 in an authentication refuse mode and sets a timer, and returns a result of processing the file save request as a processing response to the receiving unit 301 (Step S725). The receiving unit 301 returns the result of processing the file save request as a file save response to the information terminal 200 (Step S727). In this example, the result of processing the file save request is the authentication result ("the request is not authenticated").

Thereafter, the receiving unit 301 receives again the operation request from the information terminal 200 (Step S729) and requests the determining unit 305 to perform analysis (Step S731).

Thereafter, the determining unit 305 analyzes the operation request (which includes a method and a URI). When the operation request is identified to be a file save request, the determining unit 305 issues an authentication-settings acquisition request to the storage unit 32 (Step S733). The determining unit 305 acquires the authentication target information as an authentication-settings acquisition response (Step S735) and determines whether or not the file save request is an authentication target.

If the file save request is an authentication target, the determining unit 305 does not cause the authentication unit 311 to perform authentication because the authentication unit 311 is in the authentication refuse mode. Instead, the determining unit 305 returns a result of processing the file save request as a processing response to the receiving unit 301 (Step S737). The receiving unit 301 returns the result of processing the file save request as a file save response to the information terminal 200 (Step S739). In this example, "error" is returned as the result of processing the file save request.

Thereafter, when a restart request is input from the operating unit 303 (Step S751), the determining unit 305 cancels the authentication refuse mode, resets the timer (Step S753), and returns a response notifying that the authentication refuse mode is canceled (Step S755).

Also when the timer which has counted the predetermined time is reset and an alarm is issued (Step S761), the determining unit 305 cancels the authentication refuse mode (Step S763).

An access right for a restart request from the operating unit 303 may also be set so that the determining unit 305 can cancel the authentication refuse mode and reset the timer only when an input source of the restart operation has authorization to perform the restart operation.

According to the fifth embodiment, not only security can be enhanced by imposing restriction on the number of failed authentication attempts but also convenience can be secured by providing the way to restart authentication.

Program to be executed by the image projection apparatus 300 according to each of the embodiments is described below.

The program to be executed by the image projection apparatus 300 according to each embodiment may be pre-installed on a ROM or the like.

Alternatively, the program to be executed by the image projection apparatus 300 according to each embodiment may be configured to be recorded on a tangible non-transitory computer-readable recording medium such as a CD-ROM, an FD (flexible disk), a CD-R, or a DVD (digital versatile disk) as a file in an installable or executable format.

The program to be executed by the image projection apparatus 300 according to each embodiment may be configured to be stored on a computer connected to a network such as the Internet to be provided by being downloaded via the network. The program to be executed by the image projection apparatus 300 according to each embodiment may be configured to be provided or distributed via a network such as the Internet.

The program to be executed by the image projection apparatus 300 according to each embodiment has a module structure for implementing the above-described units on a computer. From the viewpoint of actual hardware, the CPU loads the program read out from the ROM onto the RAM and executes the program, thereby implementing the units on the computer.

According to an aspect of the present invention, even if an external storage device externally connected to an image output apparatus does not have a security function, attempt by an unauthorized third party to access the external storage device via the image output apparatus can be blocked.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image output apparatus for outputting an output target image acquired from an external storage device externally connected to the image output apparatus and storing the output target image, the image output apparatus comprising:

processing circuitry configured to receive an operation request requesting to perform an operation related to the external storage device; and an authentication-information memory with authentication information stored therein, wherein the processing circuitry is further configured to determine whether the operation request is an authentication target requiring authentication, and when it is determined that the operation request is the authentication target, perform authentication of the operation request using the authentication information to determine whether the operation can be performed, and control access to the external storage device based on a result of the authentication, the image output apparatus further includes an authentication-target-information memory with authentication target information defining operation requests, the operation requests being authentication targets, stored therein, and the processing circuitry receives the operation request, which indicates the operation on the external storage device, determines whether or not the operation request is the authentication target using the authentication target information, and authenticates the operation request when the operation request is the authentication target.

2. The image output apparatus according to claim 1, wherein when the operation request is authenticated, the processing circuitry provides control for enabling the operation on the external storage device requested by the operation request, and when the operation request is not authenticated, the processing circuitry provides control for disabling the operation on the external storage device requested by the operation request.

3. The image output apparatus according to claim 1, wherein when the operation request is not an authentication target, the processing circuitry provides control for enabling the operation on the external storage device requested by the operation request.

4. The image output apparatus according to claim 1, wherein the operation request is at least any one of a request for deleting the output target image, a request for acquiring the output target image, a request for saving the output target image, a request for projecting the output target image, a request for acquiring status of the output target image, a request for deleting a directory, a request for acquiring a directory, a request for creating a directory, a request for acquiring status of a directory, and a request for acquiring status of the external storage device.

5. The image output apparatus according to claim 1, wherein the operation request contains authentication subject information for use in authenticating a request source, and the processing circuitry authenticates the operation request by checking the authentication subject information against the authentication information.

6. The image output apparatus according to claim 5, further comprising:

an authorization-information memory with authorization information defining authorization of operation requests stored therein, wherein the processing circuitry is further configured to determine whether or not a request source of the operation request has authorization to perform the operation request using the authentication subject information and the authorization information, and provide control for disabling the operation on the external storage device requested by the operation request when the request source does not have authorization to perform the operation request.

7. The image output apparatus according to claim 1, further comprising:

an authentication-scheme-information memory with authentication scheme information defining applicable authentication schemes stored therein, wherein the operation request contains authentication-scheme identification information for identifying an authentication scheme, and the processing circuitry determines whether or not the authentication scheme indicated by the authentication-scheme identification information is an applicable authentication scheme using the authentication scheme information, and provides control for disabling the operation on the external storage device requested by the operation request when the authentication scheme indicated by the authentication-scheme identification information is not an applicable authentication scheme.

8. The image output apparatus according to claim 1, wherein when a predetermined number of consecutive failed authentication attempts occur, the processing circuitry does not accept authentication of the operation request.

9. The image output apparatus according to claim 8, wherein when the predetermined number of consecutive failed authentication attempts occur, the processing circuitry accepts authentication of the operation request after lapse of a predetermined time.

10. The image output apparatus according to claim 8, wherein when the predetermined number of consecutive failed authentication attempts occur, the processing circuitry accepts authentication of the operation request based on a restart request input from an input interface.

11. The image output apparatus according to claim 1, wherein the external storage device externally connected to the image output apparatus is provided as a plurality of external storage devices.

12. An image output system, comprising:

an external storage device storing an output target image; and an image output apparatus externally connected to the external storage device and configured to acquire the output target image from the external storage device and output the output target image, wherein the image output apparatus includes processing circuitry configured to receive an operation request requesting to perform an operation with respect to the external storage device; and an authentication-information memory with authentication information stored therein, wherein the processing circuitry is further configured to determine whether the operation request is an authentication target requiring authentication, and when it is determined that the operation request is the authentication target, perform authentication of the operation request using the authentication information to determine whether the operation can be performed, and control access to the external storage device based on a result of the authentication, the image output apparatus further includes an authentication-target-information memory with authentication target information defining operation requests, the operation requests being authentication targets, stored therein, and the processing circuitry receives the operation request, which indicates the operation on the external storage device, determines whether or not the operation request is the authentication target using the authentication target information, and authenticates the operation request when the operation request is the authentication target.

13. A non-transitory computer-readable recording medium having a program including instructions that, when executed by a computer configured to acquire an output target image stored in an external storage device externally connected to the computer and output the output target image, cause the computer to:

receive an operation request requesting to perform an operation with respect to the external storage device;

determine whether the operation request is an authentication target requiring authentication, and when it is determined that the operation request is the authentication target, perform authentication of the access request using the authentication information stored in an authentication-information memory to determine whether the operation can be performed; and control access to the external storage device based on a result of the authentication, wherein the recording medium further causes the computer to receive an operation request, which indicates the operation on the external storage device, determine whether or not the operation request is the authentication target using authentication target information stored in an authentication-target-information memory, the authentication target information defining operation requests, the operation requests being authentication targets, and authenticate the operation request when the operation request is the authentication target.

\* \* \* \* \*